United States Patent
Mehta et al.

(10) Patent No.: US 7,864,864 B2
(45) Date of Patent: Jan. 4, 2011

(54) CONTEXT BUFFER ADDRESS DETERMINATION USING A PLURALITY OF MODULAR INDEXES

(75) Inventors: Kalpesh D. Mehta, Chandler, AZ (US); Wen-Shan Wang, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1591 days.

(21) Appl. No.: 11/168,896

(22) Filed: Jun. 27, 2005

(65) Prior Publication Data

US 2006/0291566 A1    Dec. 28, 2006

(51) Int. Cl.
*H04N 7/12* (2006.01)
*H04B 1/66* (2006.01)

(52) U.S. Cl. .............. 375/240.24; 375/240.16

(58) Field of Classification Search .............. 348/385.1, 348/425.1, 423.1, 422.1, 388.1; 382/238, 382/239, 246; 375/240.24, 240.26, 240.23, 375/240, 240.25, 240.16, 240.12
See application file for complete search history.

(56) References Cited

U.S. PATENT DOCUMENTS

| 2004/0151389 A1* | 8/2004 | Itagaki et al. ............... 382/233 |
| 2005/0012648 A1* | 1/2005 | Marpe et al. ................ 341/107 |
| 2006/0133494 A1* | 6/2006 | Saxena et al. ........... 375/240.16 |
| 2006/0133510 A1* | 6/2006 | Saxena et al. ........... 375/240.24 |
| 2006/0212904 A1* | 9/2006 | Klarfeld et al. ............... 725/46 |

* cited by examiner

*Primary Examiner*—Behrooz Senfi
(74) *Attorney, Agent, or Firm*—Buckley, Maschoff & Talwalkar LLC

(57) ABSTRACT

According to some embodiments, context information is accessed for a current image block being processed. The context information may be, for example, associated with a block neighboring the current block, and the accessing may be performed in accordance with an address. At least one of a plurality of modular indexes may then be adjusted, and a next address may be determined in accordance with the plurality of modular indexes.

20 Claims, 17 Drawing Sheets

CONTEXT BUFFER ADDRESS DETERMINATION USING A PLURALITY OF MODULAR INDEXES

BACKGROUND

A media player may output moving images to a display device. For example, a media player might retrieve locally stored image information or receive a stream of image information from a media server (e.g., a content provider might transmit a stream that includes high-definition image frames to a television, a set-top box, or a digital video recorder through a cable or satellite network). In some cases, the image information is encoded to reduce the amount of data used to represent the image. For example, an image might be divided into smaller image portions, such as macroblocks and blocks, so that information encoded with respect to one image portion does not need to be repeated with respect to another image portion (e.g., because neighboring image portions may frequently have similar color, brightness, and/or motion characteristics). As a result, information about neighboring image portions may be locally stored and accessed by an image decoder in the media player when a particular image portion is decoded.

DETAILED DESCRIPTION

Figure 1:
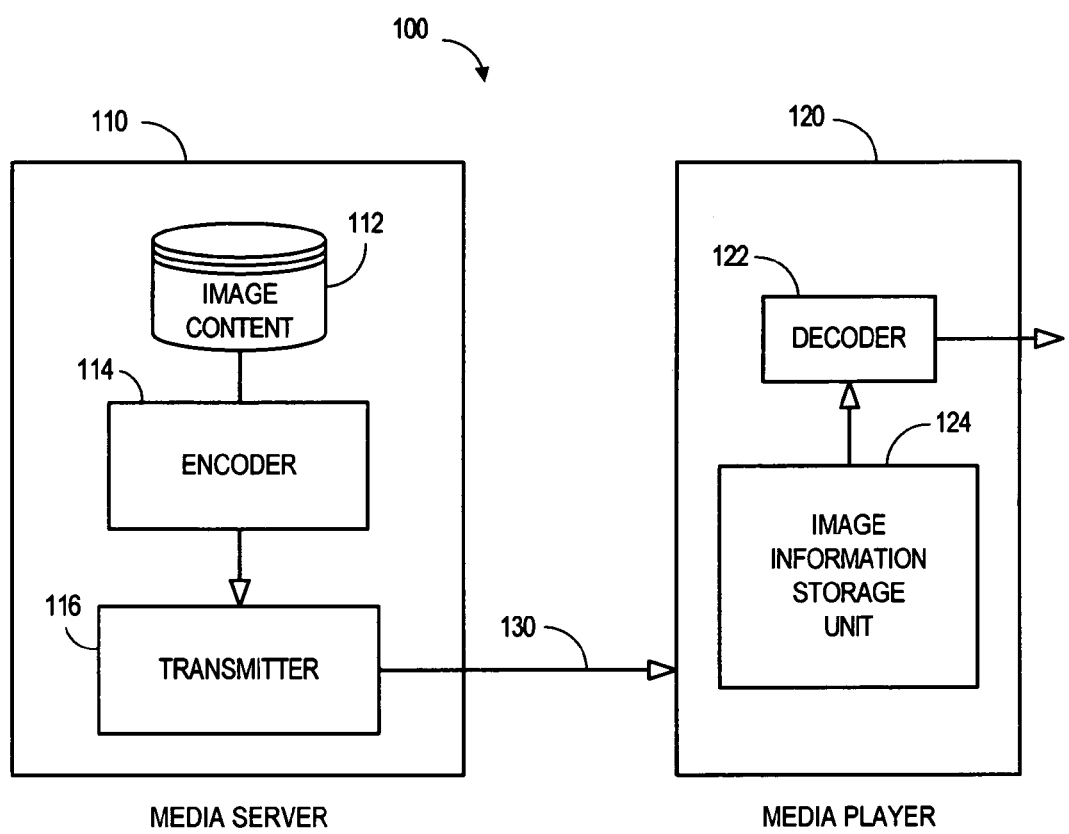
FIG. 1 is a block diagram of a media system.

A media player may receive image information, decode the information, and output a signal to a display device. For example, a Digital Video Recorder (DVR) might retrieve locally stored image information, or a set-top box might receive a stream of image information from a remote device (e.g., a content provider might transmit a stream that includes high-definition image frames to the set-top box through a cable or satellite network). FIG. 1 is a block diagram of a media system 100 including a media server 110 that provides image information to a remote media player 120 through a communication network 130.

An encoder 114 may reduce the amount of data that is used to represent image content 112 before the data is transmitted by a transmitter 116 as a stream of image information. As used herein, information may be encoded and/or decoded in accordance with any of a number of different protocols. For example, image information may be processed in connection with International Telecommunication Union-Telecommunications Standardization Sector (ITU-T) recommendation H.264 entitled "Advanced Video Coding for Generic Audiovisual Services" (2004) or the International Organization for Standardization (ISO)/International Engineering Consortium (IEC) Motion Picture Experts Group (MPEG) standard entitled "Advanced Video Coding (Part 10)" (2004). As other examples, image information may be processed in accordance with ISO/IEC document number 14496 entitled "MPEG-4 Information Technology—Coding of Audio-Visual Objects" (2001) or the MPEG2 protocol as defined by ISO/IEC document number 13818-1 entitled "Information Technology—Generic Coding of Moving Pictures and Associated Audio Information" (2000). As other examples, the image information might comprise Microsoft Windows Media Video 9 (MSWMV9) information or Society of Motion Picture and Television Engineers (SMPTE) Video Codec-1 (VC-1) information.

A received image stream may include information (such as parameter values) associated with portions of an image, and the information associated with those portions may be stored in a image information storage unit 124 external to a decoder 122. Note that information encoded with respect to one image portion might be re-used with respect to another image portion. As a result, the decoder 122 may transfer information about neighboring portions from the image information storage unit 124 into a block-based local parameter buffer or cache. The decoder 122 may then access that information from the local buffer to re-construct or decode each image portion. According to some embodiments, the local buffer is formed on the same die as the decoder 122. Note that embodiments of the present invention may be associated with either an image information storage unit 124, a local buffer, or any other device.

Figure 2:
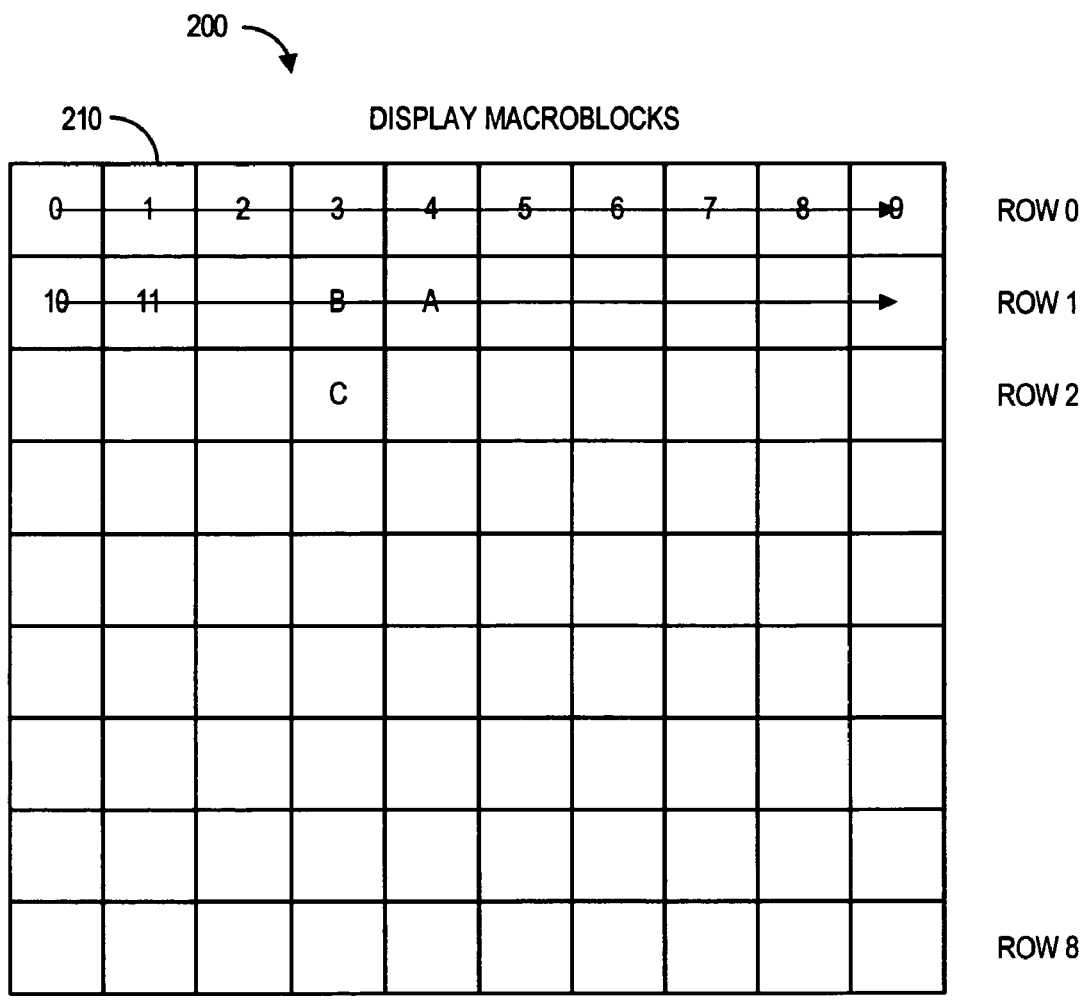
FIG. 2 illustrates a display divided into macroblocks.

Consider, for example, H.264 image information. As illustrated in FIG. 2, a display image 200 may be divided into an array of "macroblocks" 210. Each macroblock might represent a 16×16 set of picture samples or pixels. Moreover, the array may include rows, each row having, for example, one hundred and twenty macroblocks 210.

The decoder 122 may decode macroblocks 210 from left to right across rows of macroblocks 210 beginning with the top row. When one row is completed, the decoder 122 may begin to decode the first macroblock 210 of the next row.

Note that information about one macroblock 210 may have been encoded using information about neighboring macroblocks (e.g., because neighboring macroblocks 210 may frequently have similar characteristics). As a result, when a particular macroblock 210 is being decoded and/or decompressed, information about that macroblock 210 may be derived using a predicted value from one or more neighboring blocks. In some cases, a predicted parameter is derived from a single neighboring block's parameter while in other cases it is derived from parameters associated with multiple neighboring blocks.

In particular, consider the macroblock "*" illustrated as a shaded block in FIG. 2. To decode macroblock *, the decoder 122 may use parameter values previously determined for neighboring macroblocks A, B, and C to determine a predicted parameter value for macroblock *. A difference between the predicted parameter value and the actual parameter value (referred to as a "residue") may be received in the stream of image information, and the decoder 122 can use the predicted parameter value and this difference to generate the actual parameter value. The actual parameter value may then be used to generate an output representing the original image content 112 (as well as being used when determining an actual parameter value for a subsequent neighboring macroblock). Some examples of information that might be processed in this way include a motion vector (x and y components), intra-prediction mode data, and/or a reference frame indices list.

After macroblock * is decoded, the output engine may begin to decode the macroblock to the right of macroblock * (and macroblock * will now become macroblock C, macroblock A will now become macroblock B, etc.).

Figure 3:
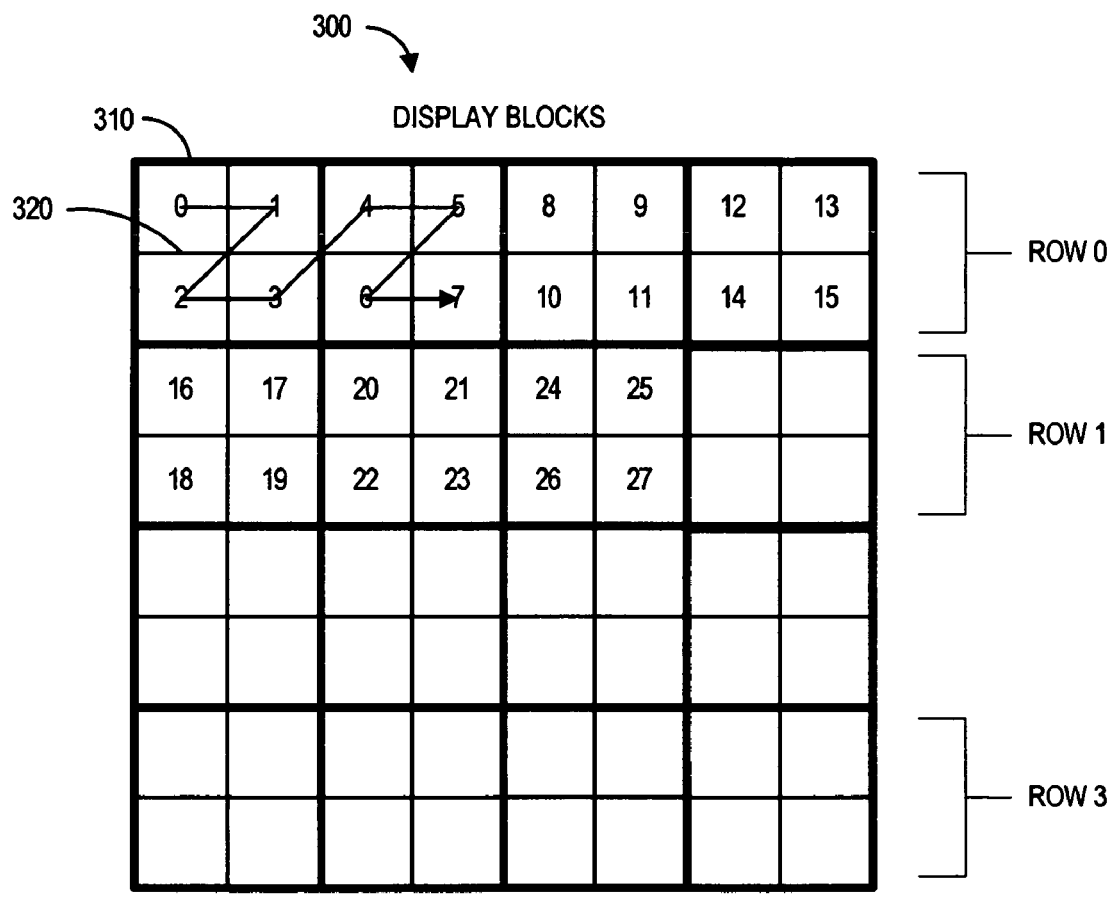
FIG. 3 illustrates a display divided into macroblocks and blocks.

In some cases, macroblocks may further be divided into smaller blocks of image information. For example, FIG. 3 illustrates a display 300 divided into macroblocks 310 and blocks 320 as might be the case for a Y component of a video. As before, the macroblocks 310 are processed from left to right, starting with the top row. Within each macroblock 310, each block 320 is processed in the following order: (1) top left, (2) top right, (3) bottom left, and (4) bottom right. Moreover, information about neighboring blocks 320 may be used when processing a current block 320. For example, information associated with the block 320 immediately above, the block 320 immediately to the left, and the block 320 diagonally above and to the left might be used. In the example illustrated in FIG. 3, when shaded block 24 is being processed, parameters associated with blocks 7, 10, and 21 might be accessed.

The information about current block being processed and the neighboring blocks, referred to as "context" information, may be stored in a context buffer. The size of the data that is stored, however, may be relatively large. Moreover, it may be difficult to manage the data in the context buffer. For example, some blocks may later be needed as a neighboring block while other blocks are not.

In one approach, image information in a large context buffer may be accessed (e.g., read from and stored into) using the macroblock numbers and/or block numbers as an index or address value. That is, each and every block might be stored in a pre-determined location in the context buffer. Although such a technique may provide a simple addressing scheme, the size of the context buffer might make the decoder 122 impractical. For example, a 1280×720 HDTV decoder that uses 32-words of context data for each macroblock might require a context buffer with 32*3,600 words of memory. In some cases, it may be impractical to locally store that amount of information, such as when the decoder 122 is associated with a System on Chip (SoC) design.

As another approach, slightly more than one row of macroblock data might be stored in the context buffer, and the macroblock numbers and/or block numbers may be used as an index or address value. In this case, the context buffer might have 32*(120+1) words of memory. Note, however, that the decoder 122 might need to ensure that macroblock data being written into the context buffer does not over-write the previous data. Moreover, the decoder 122 may need to use one pointer to get the context information associated the two blocks above the current block, and a different pointer to get the context information associated with the block to the left of the current block.

Figure 4:
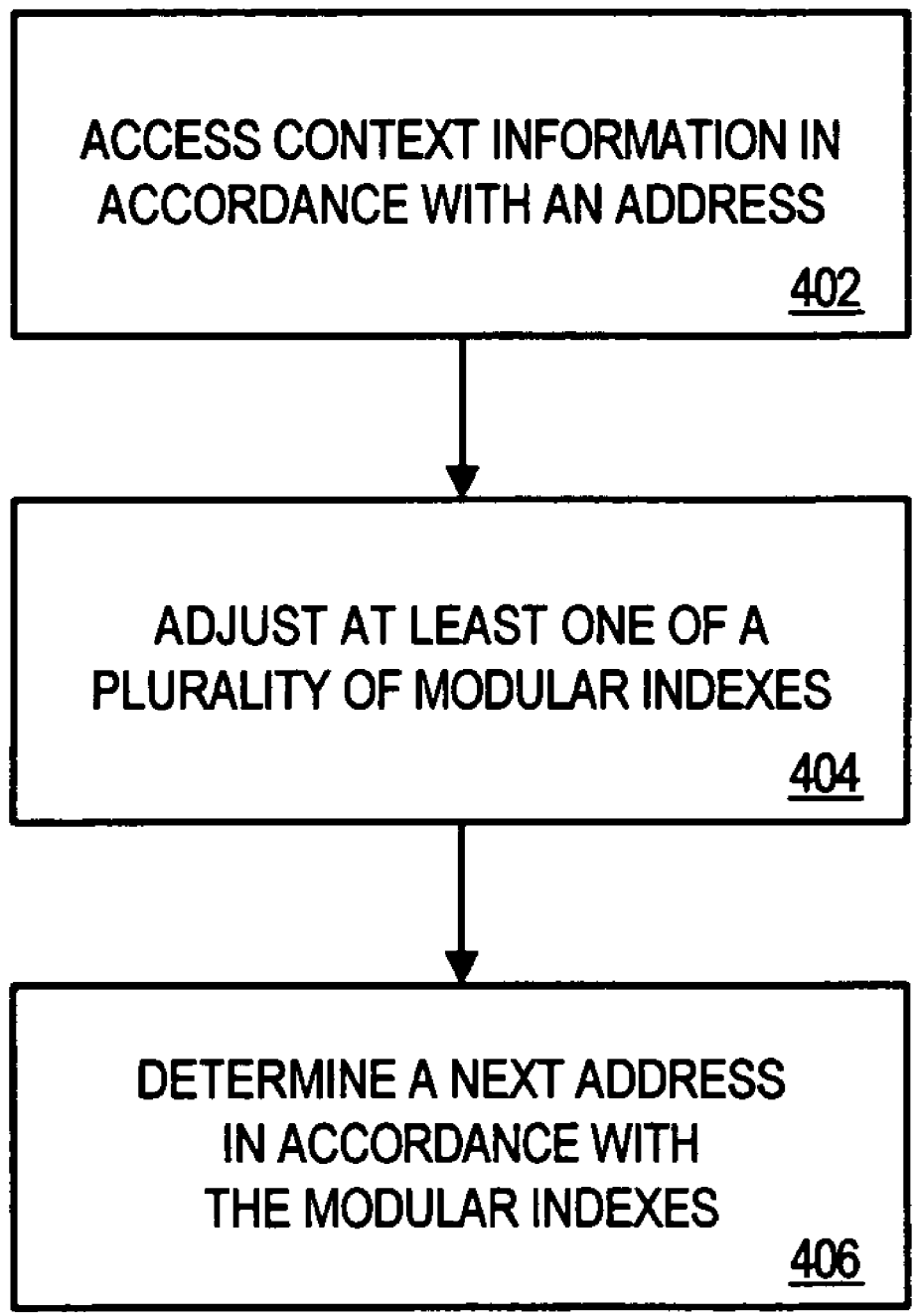
FIG. 4 is a flow diagram illustrating a method according to some embodiments.

FIG. 4 is a flow diagram illustrating a method according to some embodiments. The method may be performed, for example, by the decoder 122 of FIG. 1. The flow charts described herein do not necessarily imply a fixed order to the actions, and embodiments may be performed in any order that is practicable. Note that any of the methods described herein may be performed by hardware, software (including microcode), firmware, or any combination of these approaches. For example, a storage medium may store thereon instructions that when executed by a machine result in performance according to any of the embodiments described herein.

At 402, context information for a current image block being processed is accessed in accordance with an address (e.g., retrieved from or stored into a context buffer). The context information may be, for example, associated with a block neighboring the current block.

At 404, at least one of a plurality of "modular" indexes are adjusted. As used herein, a modular index may be any value that "wraps around" after it reaches a certain value (the "modulus"). For example, a modular index having a modulus of four might be increments by one to produce the following sequence: 0, 1, 2, 3, 0, 1, 3, 0, etc. According to some embodiments, one or more indexes may be incremented by a value other than one.

At 406, a next address is determined in accordance with the plurality of modular indexes. For example, the values of the indexes might be added together in a modular fashion to generate the address. According to some embodiments, the result of the addition might be multiplied (e.g., based on the size of the one block's worth of context data to generate the address.

Figure 5:
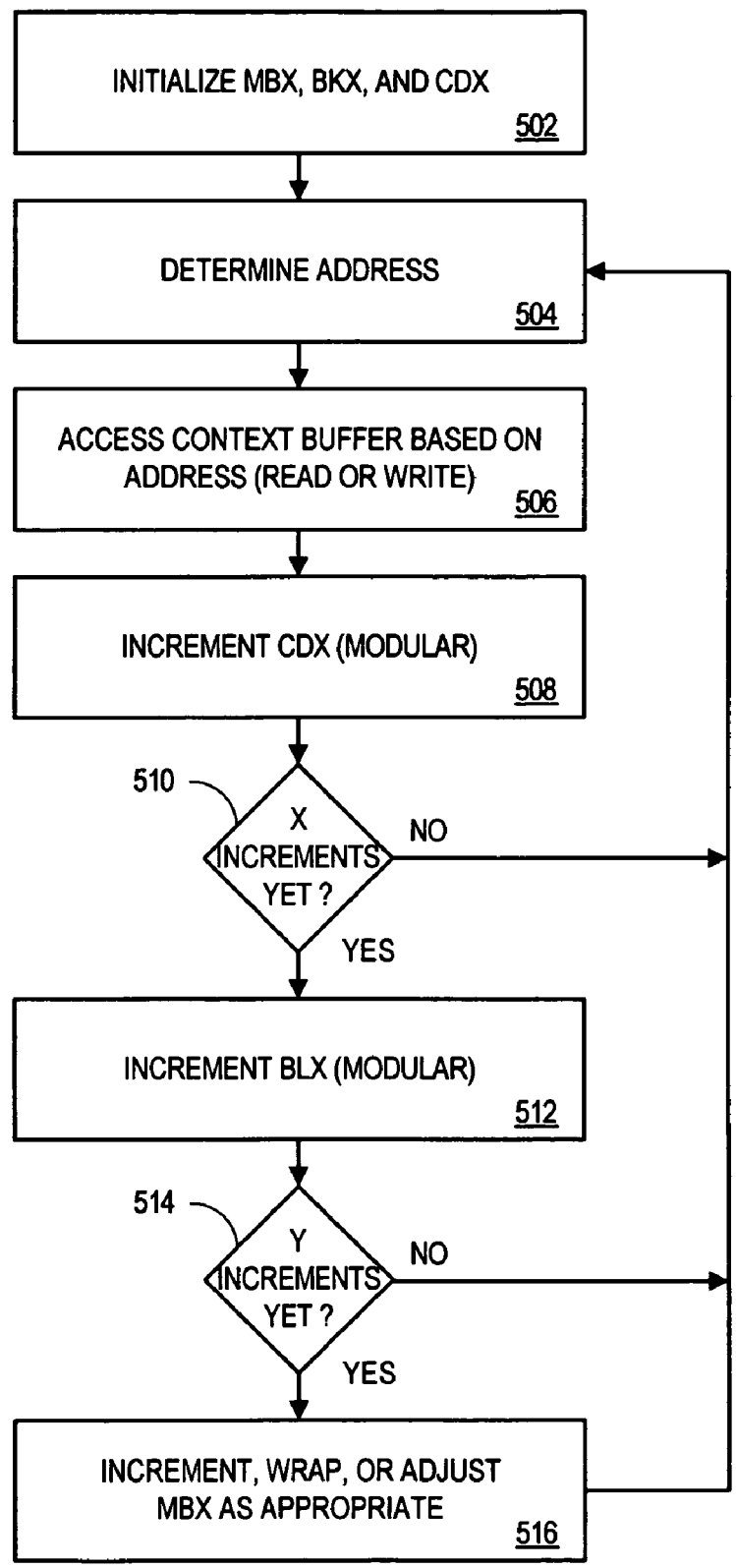
FIG. 5 is a flow diagram illustrating a method according to some embodiments.

By way of example, FIG. 5 is a flow diagram illustrating a method according to some embodiments. In this embodiment, a decoder may use the following modular indexes:

MBX—macroblock index
BKX—block index
CDX—context index

According to some embodiments, one index might have one modulus while another index has a different modulus. At 502, the MBX, BKX, and CDX indexes are set to an initial value. Note that, according to some embodiments, the indexes are initialized to a non-zero value and that different indexes could be initialized to different values.

At 504, an address is determined based at least in part on the indexes. The address may be associated with, for example, a modular addition of the macroblock index value, the block index value, and the context index value. According to some embodiments, the result of the addition is multiplied by a pre-determined amount (e.g., based on the size of the context data) to determine the address.

At 506, a buffer is accessed based on the address determined at 504. For example, a 16 word context buffer might have locations associated with addresses 0-15. In this case, the address determined at 504 might represent one of those locations. Note that the access might comprise, for example, reading data associated with a neighboring block or writing data associated with a block currently being constructed.

At 508, the CDX index is incremented. Note that an index might be incremented by one or a non-one value. Also note that any embodiment described herein may be associated with a technique that decrements index values. Assume, for example, that the CDX index has a modulus of 4, that it was initialized to "2" at 502, and that it is incremented by one. In this case, value of the CDX index would equal 2, 3, 0, 1, etc.

At 510, it is determined whether the CDX index has been incremented X number of times. For example, it might be determined whether or not the CDX index was incremented four times (once for each block in a macroblock). If not, the process continues at 504. If it has been incremented X times, then the BKX index is incremented at 512.

At 514, it is determined whether the BKX index has been incremented Y number of times. Note that Y might be equal to X or have a value other than X. For example, it might be determined whether or not the BKX index was incremented four times. If not, the process continues at 504. If it has been incremented Y times, then the MBX index may be incremented or otherwise adjusted at 516.

FIGS. 6 through 14 illustrate context buffer accesses according to some embodiments. Assume for this example that the size of the context data for a single block is 1 word, each macroblock row in the display has 12 macroblocks (e.g., 0 through 11), and that the context buffer 600 can store 28 words of information (e.g., in locations 0 through 27). In addition CDX and BKX have a modulus of four and MBX has a modulus of 28. Moreover, the decoder will manage the indexes in accordance with the following pseudo code:

```
MBX = 7;
for (row = 0; row < Maxrows; row++)
  BKX = 2; // initialize BKX
  CDX = 2; // initialize CDX
  for (i = 0; i < MaxMBX; i++) // MaxMBX = 12 when 12 MB in row
    for (j = 0; j < 4; j++)
      for (k = 0; k < 4; k++)
        Address = (MBX + BKX + CDX) mod 28; //28 = # of
          blocks in buffer
        CDX = (CDX + 1) mod 4;
      end for; // for k ..
      BKX = (BKX + 1) mod 4;
    end for;   // for j ..
    MBX = (MBX + 2) mod 28;
  end for;     // for i ..
end for;       // for row ..
```

Although a context buffer having 28 locations is used as an example, note that the context buffer could have, for example, more locations. According to some embodiments, the number of locations in a context buffer is selected to be $2^N$. Such an approach might, for example, facilitate the incrementing of MBX (e.g., a mod $2^N$ operation might be more simple to implement).

Figure 6:
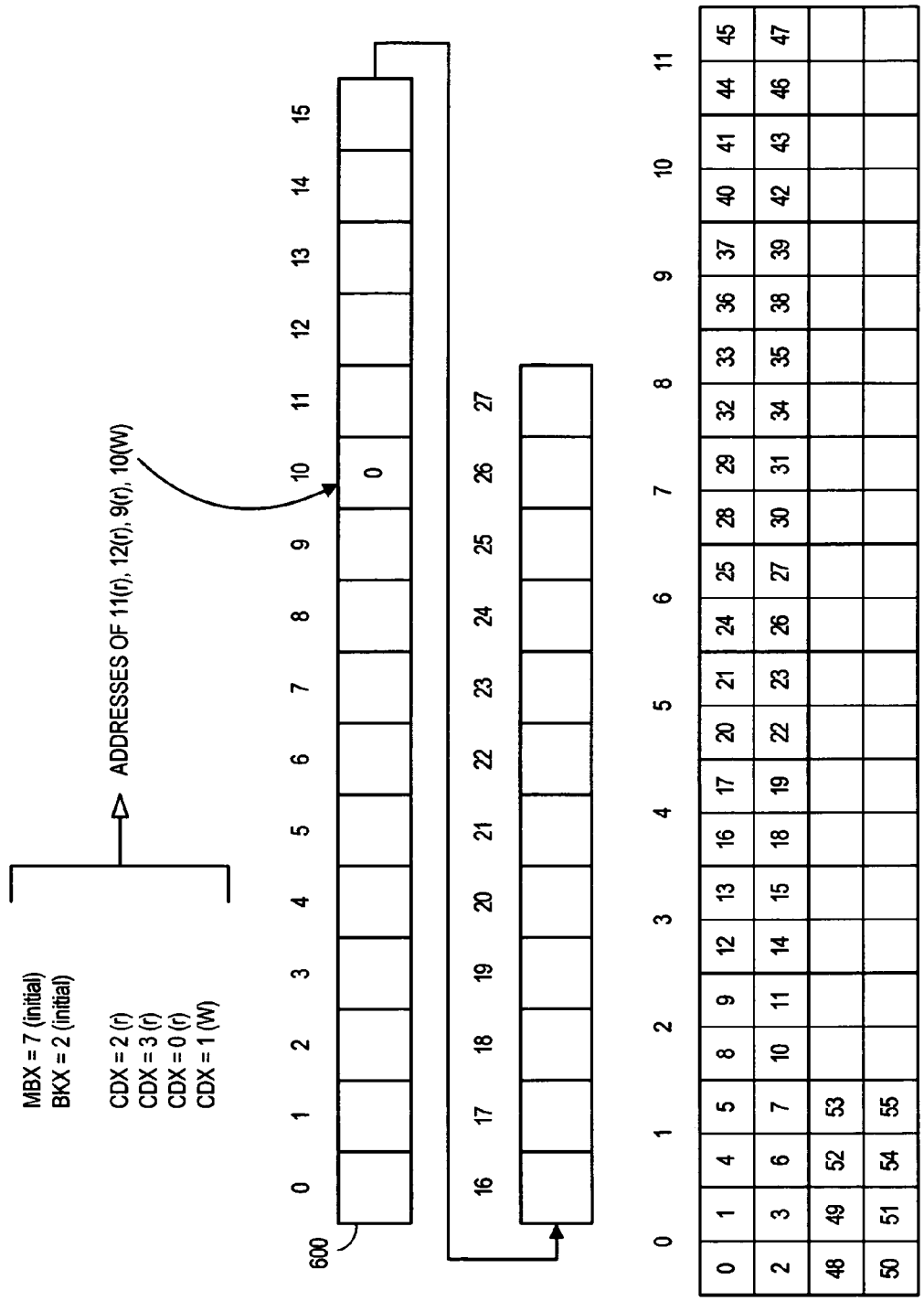
FIGS. 6 through 14 illustrate context buffer accesses according to some embodiments.

FIG. 6 represents the first set of passes through the k loop which is associated with block 0. Thus, the MBX index has been initialized to 7, and the BKX index has been initialized to 2. The CDX index was also initialized to 2, and will therefore have values of 2, 3, 1, 0 as it passes through the k loop. According to this embodiment, the first three passes through the k loop generate addresses that are used to read parameters associated with neighboring blocks from the context buffer 600, and the fourth pass generates an address that is used to store parameters associated with the block currently being created. That is modulo 28 addition of the index values for the first three passes (11, 12, and 9) are used to read from the context buffer. Note that since this is the first block being processed, no information about neighboring blocks is available. According to some embodiments, at least one buffer location can be initialized with default boundary information. For example, locations 11, 12, and 9 might have been initialed with parameters that should be used when processing an image block located next to the top and left display boundaries. The fourth pass generates an address of 10, and parameters associated with block 0 are stored into the tenth location of the context buffer 600.

Figure 7:
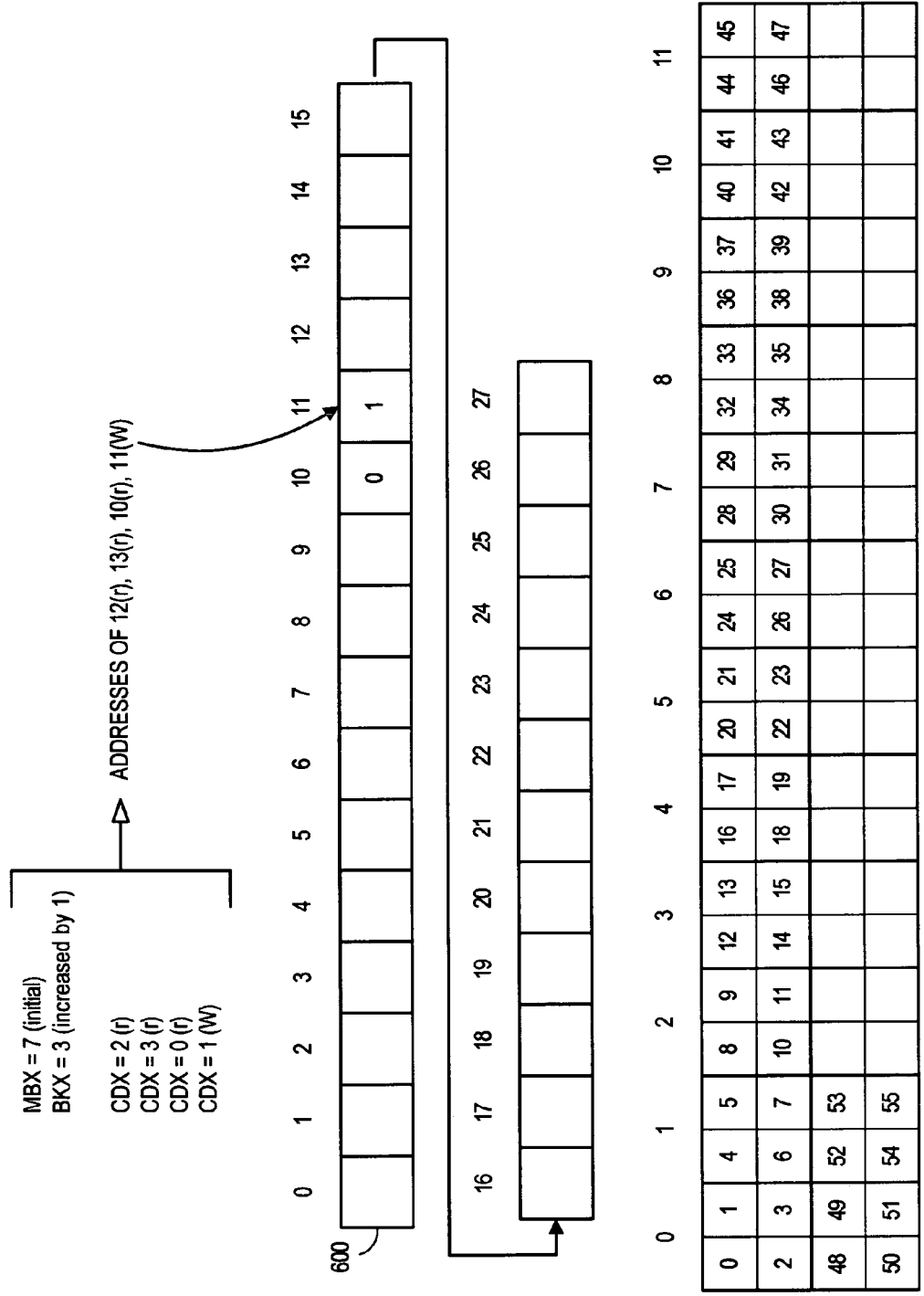

After passing though the k loop four times, BKX is incremented by one (and is now equal to 3). As illustrated in FIG. 7, the k loop is repeated to process block 1 (shaded), and read addresses of 12, 13, and 10 are generated. Note that reading from the tenth location of the context buffer 600 will let the decoder access parameters associated with block 0 (which is an appropriate neighboring block). The fourth pass generates an address of 11, and parameters associated with block 1 are stored into location 11 of the context buffer 600.

Figure 8:
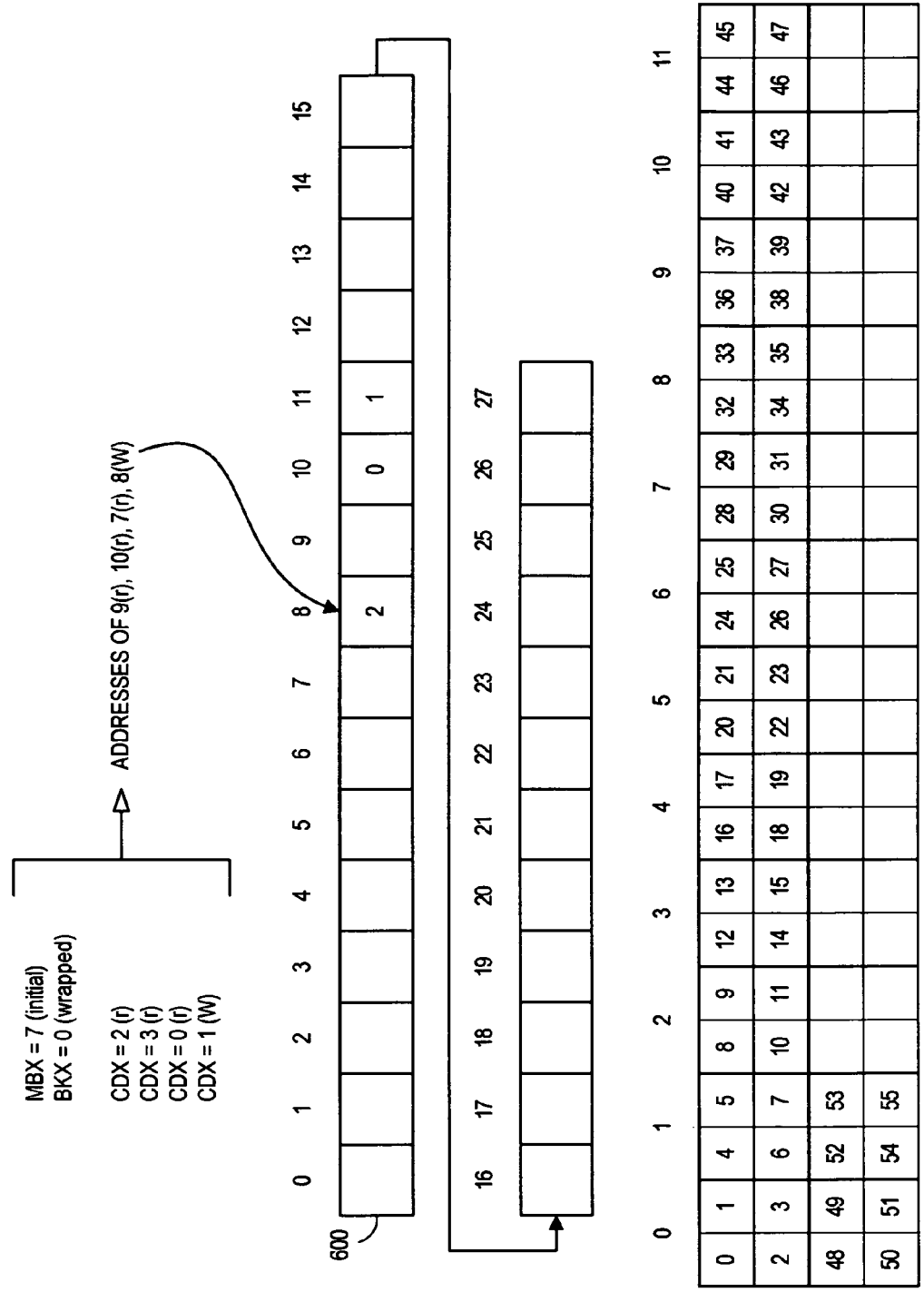

BKX is again incremented by one (and is now equal to 0, since it has a modulus of 4). FIG. 8 illustrates the k loop being repeated to process block 2 (shaded), and read addresses of 9, 10, and 7 are generated. Note that reading from the tenth location of the context buffer 600 will let the decoder access parameters associated with block 0 (which is again an appropriate neighboring block). The fourth pass generates an address of 8, and parameters associated with block 2 are stored into location 8 of the context buffer 600.

Figure 9:
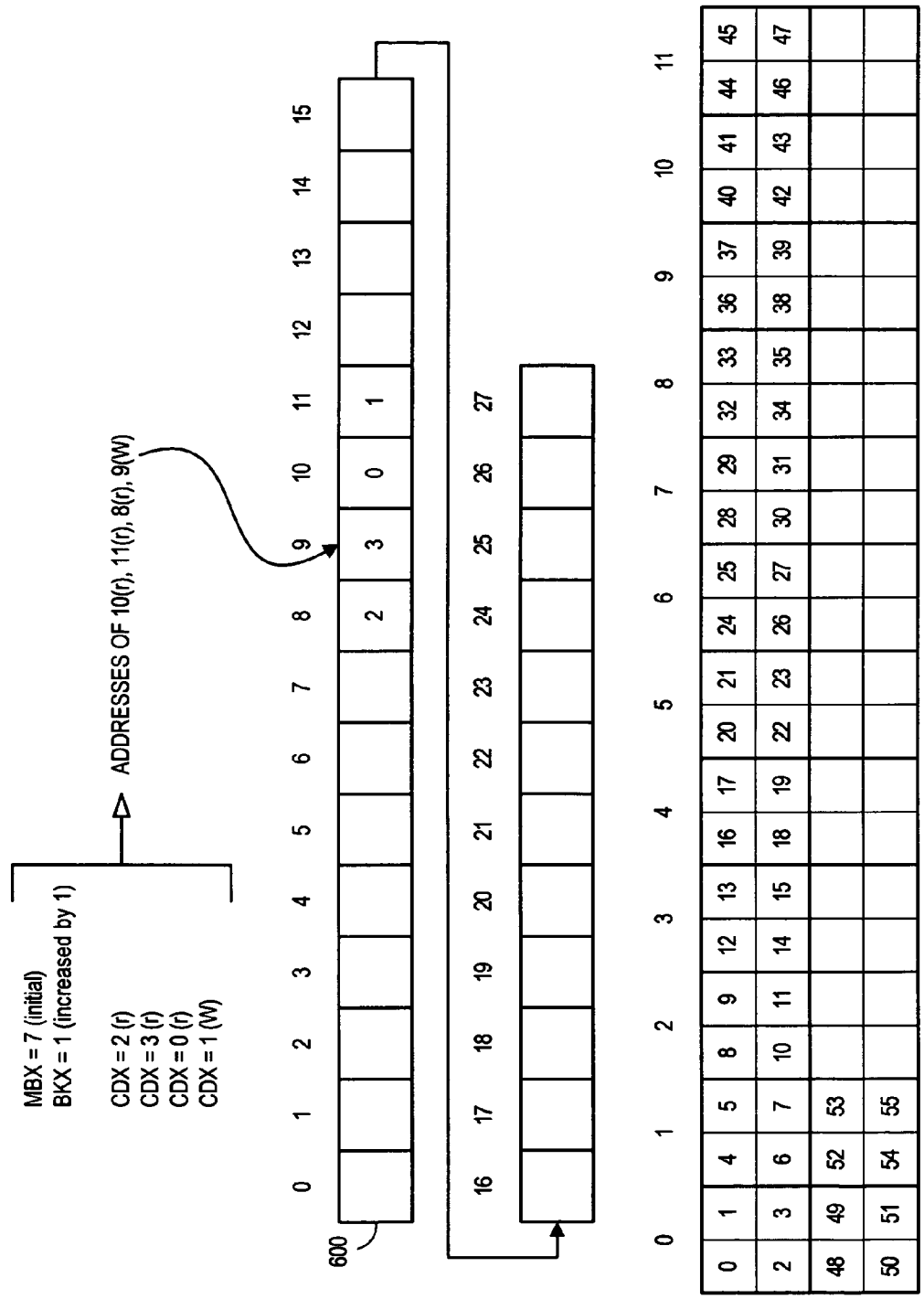

BKX is again incremented by one (and is now equal to 1). FIG. 9 illustrates the k loop being repeated to process block 3 (shaded), the last block of the first macroblock. In this case, read addresses of 10, 11, and 8 are generated. Note that all of these locations in the context buffer 600 are now storing appropriate neighboring block parameters (e.g., associated with blocks 0, 1, and 2). The fourth pass generates an address of 9, and parameters associated with block 3 are stored into location 9 of the context buffer 600.

Figure 10:
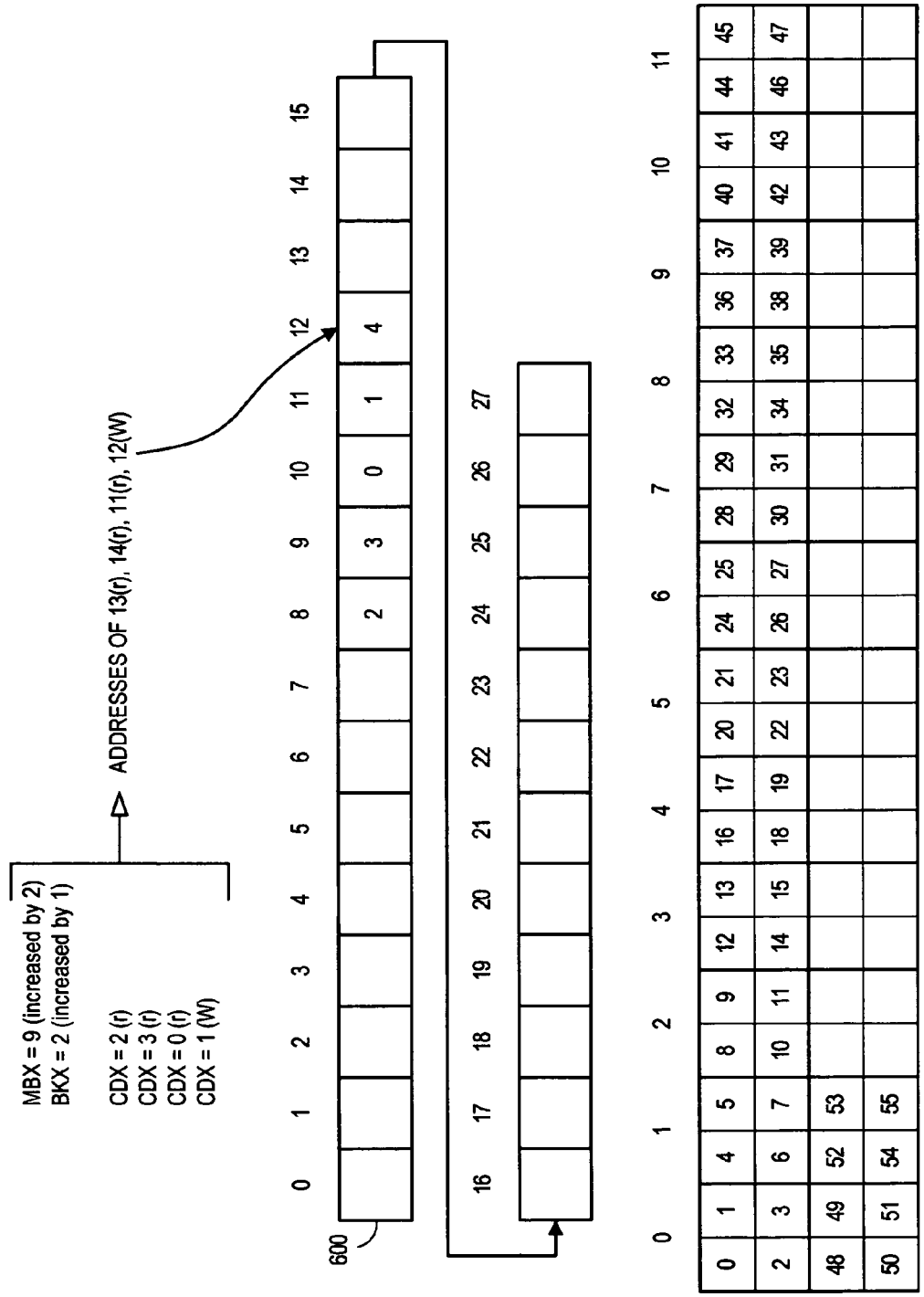
Figure 11:
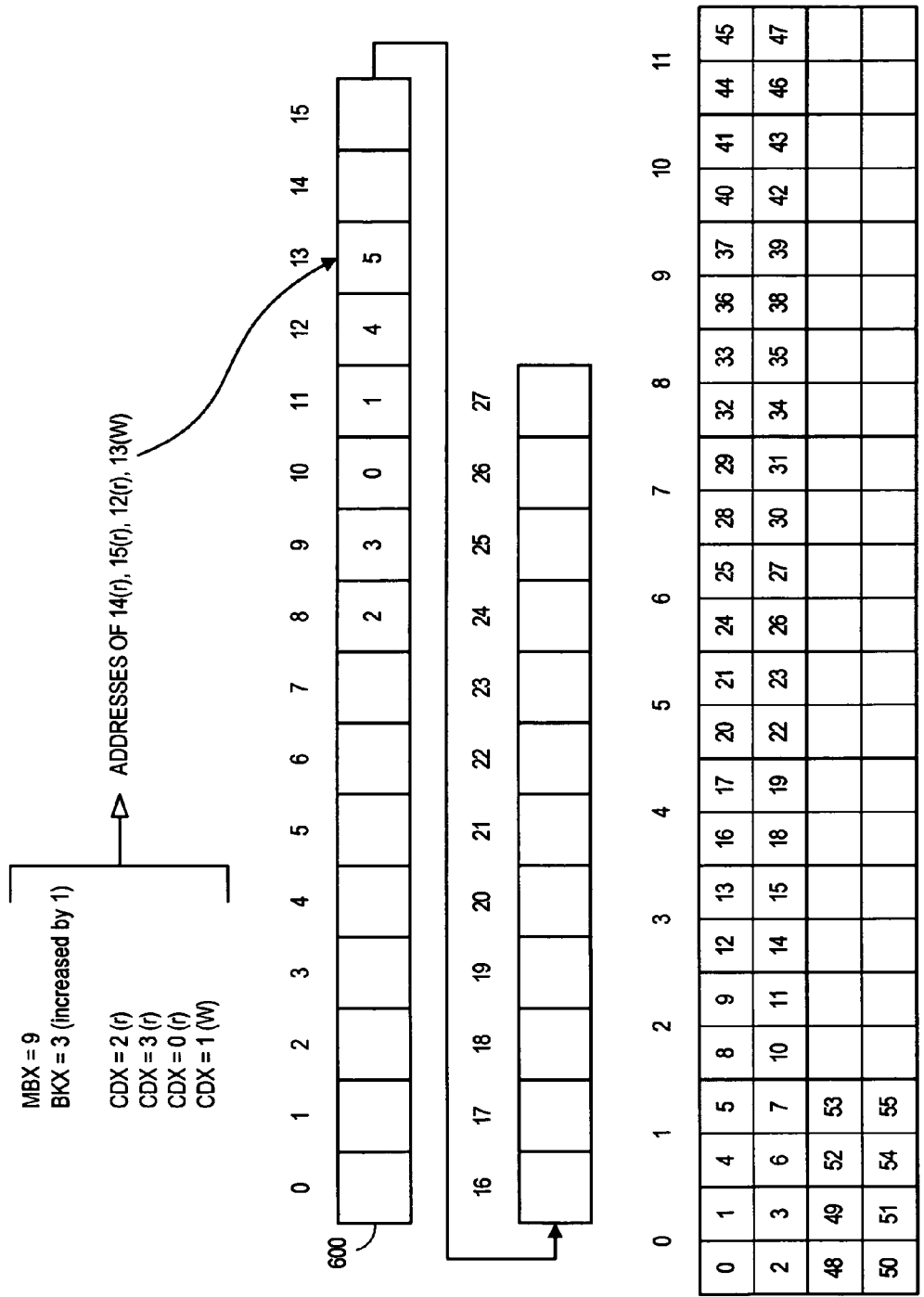

Because BKX has been incremented four times, MBX is incremented by 2. As illustrated by FIG. 10, the decoder then processes block 4 (shaded) by generating read addresses of 13, 14, and 11. Note that reading from 11 will let the decoder access parameters associated with block 1. The fourth pass through the k loop generates an address of 12, and parameters associated with block 4 are stored into location 12 of the context buffer 600. Similarly, in FIG. 11 the decoder processes block 5 (shaded) by generating read addresses of 14, 15, and 12. Note that reading from 12 will let the decoder access parameters associated with block 4. The fourth pass through the k loop generates an address of 13, and parameters associated with block 5 are stored into location 13 of the context buffer 600.

Figure 12:
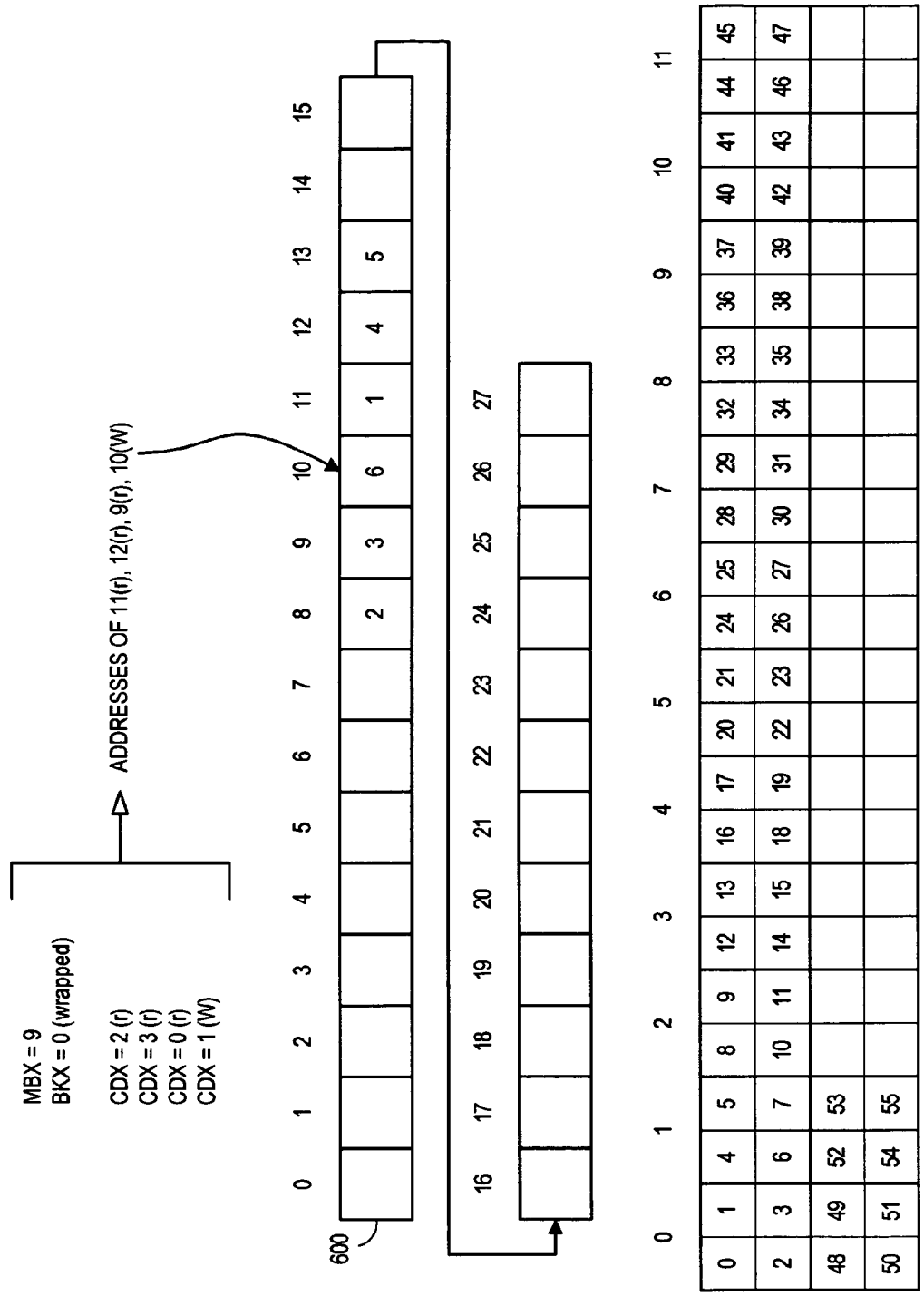

In FIG. 12, the decoder processes block 6 (shaded) by generating read addresses of 11, 12, and 9. Once again, these locations in the context buffer 600 currently store information associated with the appropriate neighboring blocks (1, 4, and 3, respectively). The fourth pass through the k loop generates an address of 10, and parameters associated with block 6 are stored into location 10 of the context buffer 600. Note that this information will over-write the parameters associated with block 0 (which were written into the tenth location of the context buffer 600 as described with respect to FIG. 6). Also note that the parameters associated with block 0 are no longer needed (it will not be a neighbor of any future blocks that will be processed).

Figure 13:
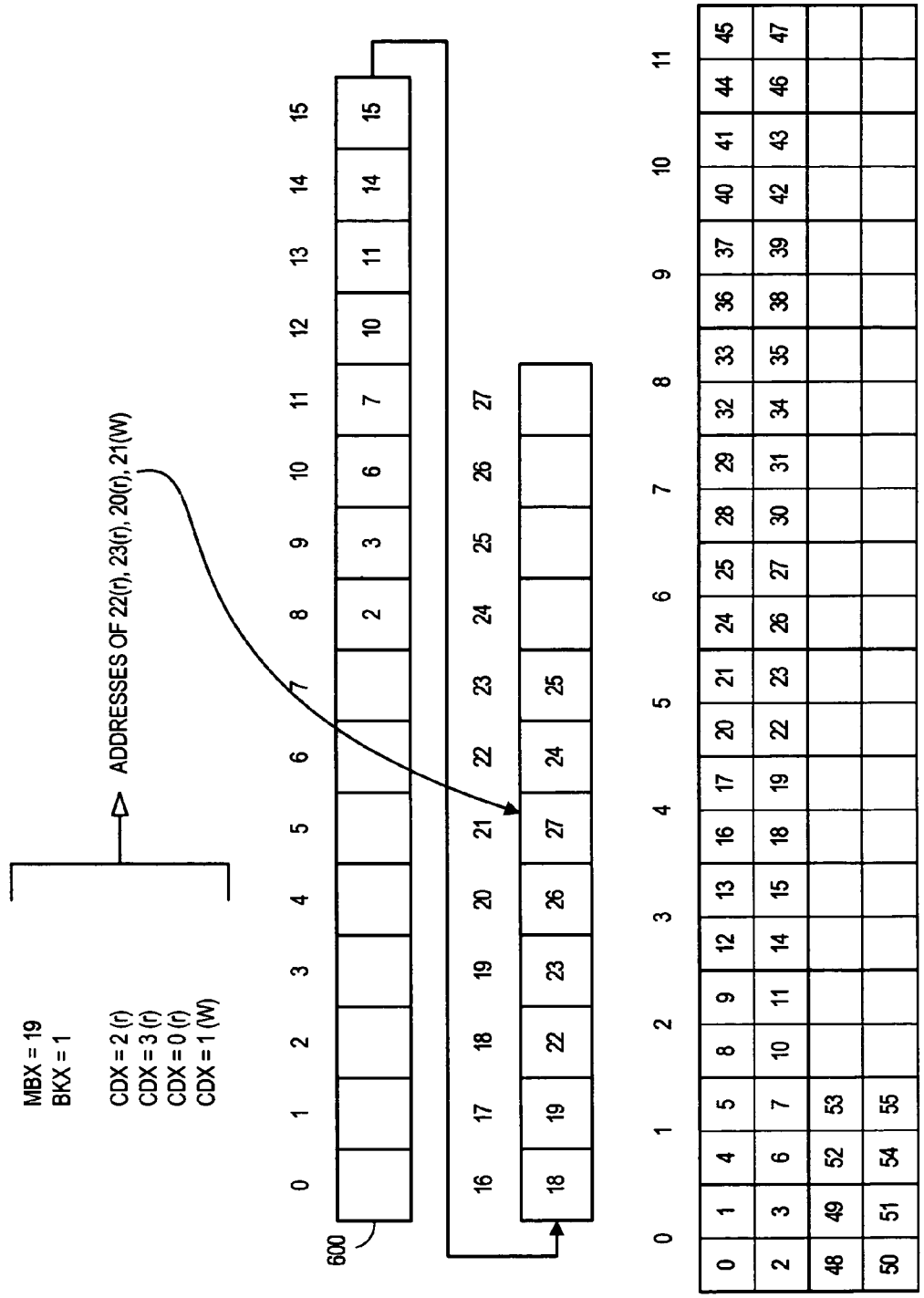

FIG. 13 illustrates the state of the context buffer while block 27 (shaded) is processed by the decoder. At this point, the MBX has a value of 19, and the BKX index has a value of 1. Thus, the first three passes through the k loop will generate read addresses of 22, 23, and 20 which currently store information associated with the appropriate neighboring blocks (24, 25, and 26, respectively). The fourth pass through the k loop generates an address of 21, and parameters associated with block 27 are stored into location 21 of the context buffer 600.

Figure 14:
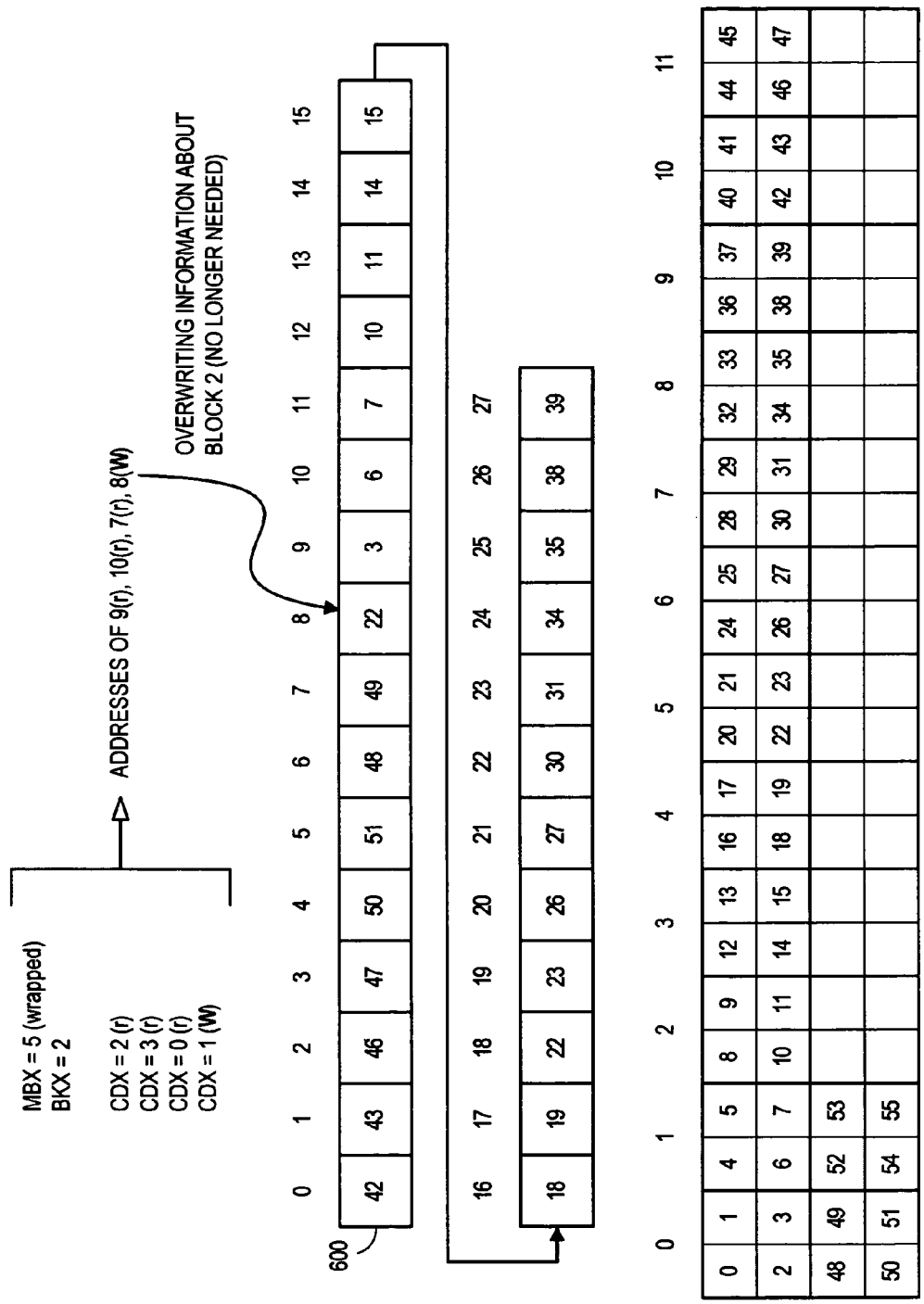

FIG. 14 illustrates the state of the context buffer while block 52 (shaded) is processed by the decoder. At this point, the MBX has a value of 5 (note that it wrapped around after it reached a value of 27), and the BKX index has a value of 2 (e.g., because 52 is the first block in its macroblock). Thus, the first three passes through the k loop will generate read addresses of 9, 10, and 7 which currently store information associated with the appropriate neighboring blocks (3, 6, and 49, respectively). The fourth pass through the k loop generates an address of 8, and parameters associated with block 52 are stored into location 8 of the context buffer 600. Note this information will overwrite information about block 2 that was previously stored at location 8 (e.g., as described with respect to FIG. 8). Also note that information about block 2 is no longer needed (e.g., because it will not be a neighboring block of any block that is subsequently processed).

Figure 15:
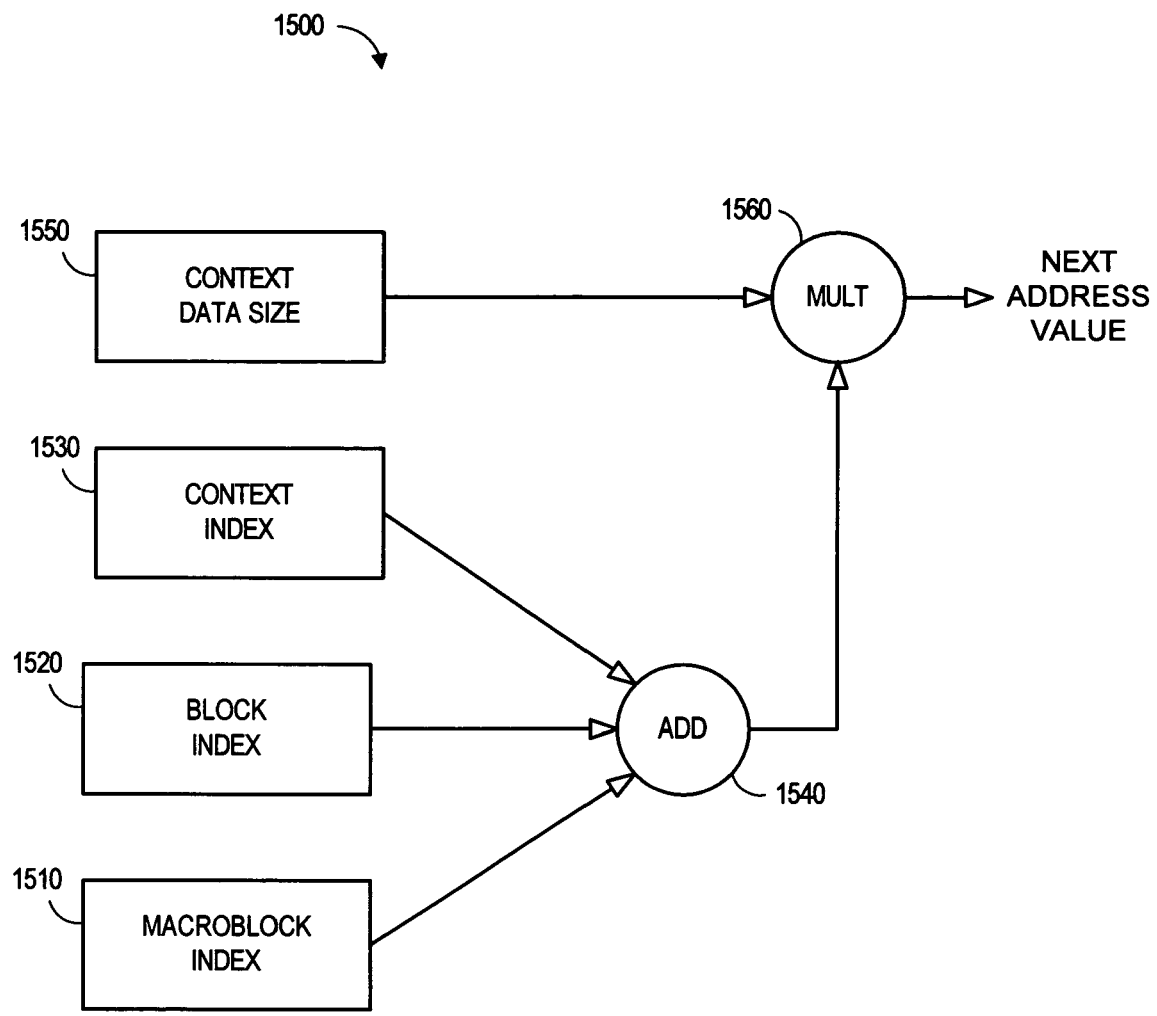
FIG. 15 illustrates an address determination unit according to some embodiments.

FIG. 15 illustrates an address determination unit 1500 according to some embodiments. The unit 1500 may be, for example, used to generate addresses as described with respect to FIGS. 6 through 14. The unit 1500 includes a macroblock index 1510, a block index 1520, and a context index 1530. The indexes 1510, 1520, 1530 and/or an adder 1540 may comprise modular elements. For example, the context index 1530 might be a 2-bit modular counter. The values of the indexes 1510, 1520, 1530 are provided to the adder 1540, and the output of the adder 1540 is provided to a multiplier 1560 along with a context data size 1550. The context data size 1550 might represent, for example, an integer indicating how many words of image information are associated with each block. For example, when the context data size 1550 equals three, the multiplier 1560 might cause the unit 1500 to calculate addresses similar to those described with respect to FIGS. 6 through 14 multiplied by three (to support the fact that each block is going to occupy three locations in the context buffer). According to some embodiments, the multiplier 1560 comprises a shifter (e.g., shifting the bits left two positions to multiply the value by four).

Note that any of the embodiments described herein might be associated with, for example, a Y component of a video, in which every macroblock includes 4 blocks. Moreover, embodiments might be associated with a U or V component of a video, in which every macroblock includes 1 block (e.g., and the implementation may be similar to that of a Y component).

Figure 16:
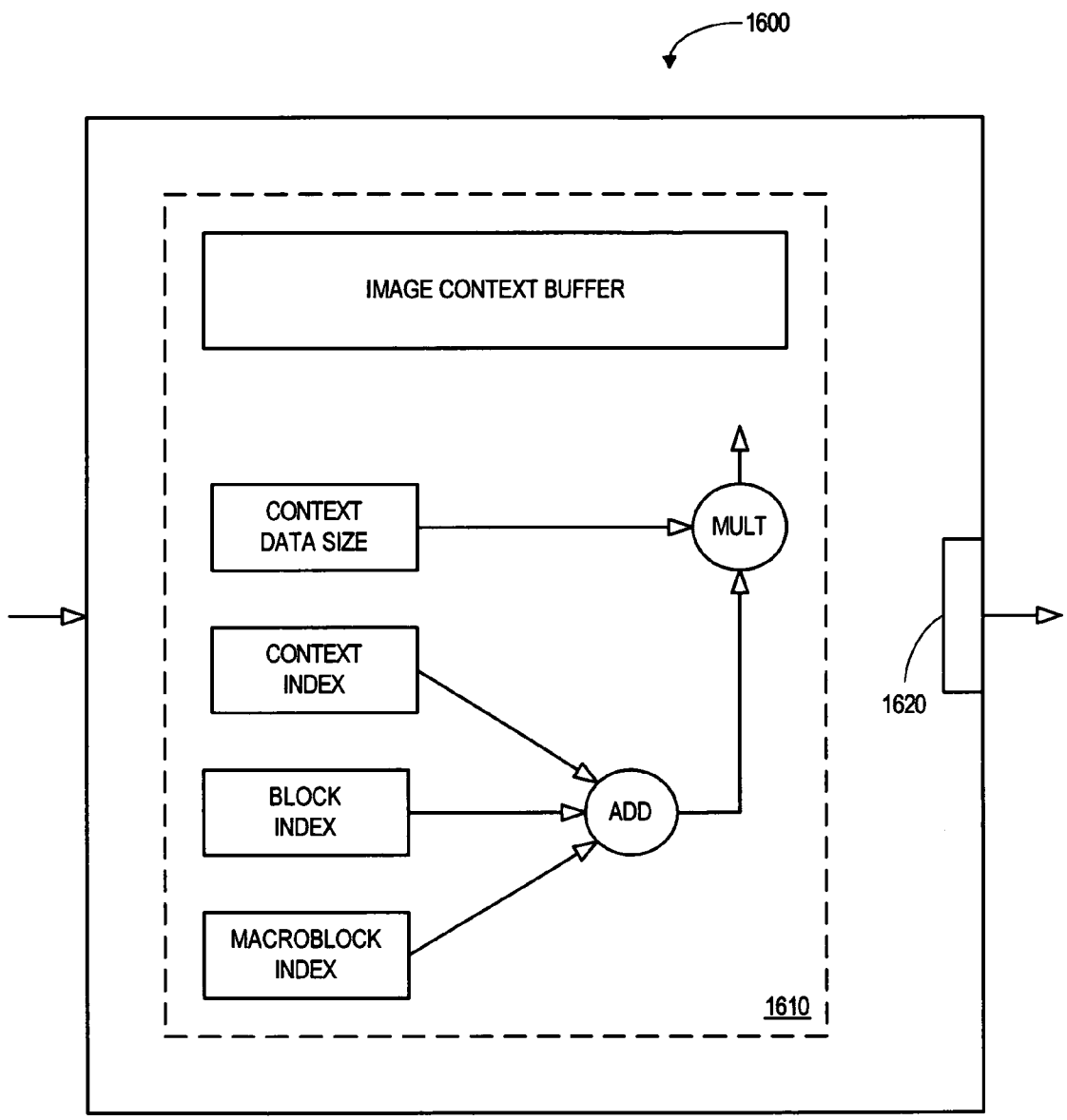
FIG. 16 is a block diagram of a system according to some embodiments.

FIG. 16 is a block diagram of a system 1600 according to some embodiments. The system 1600 might be associated with, for example, a digital display device, a television such as a High Definition Television (HDTV) unit, a DVR, a game console, a PC or laptop computer, and/or a set-top box (e.g., a cable or satellite decoder). The system includes a decoder 1610 having an image context buffer. The image context buffer may be, for example, a cache to store image information associated with blocks, each block representing a portion of an image frame. The decoder 1610 may also include a number of storage units to store values associated with modular indexes according to any of the embodiments described herein. The values may be used, for example, to determine an address associated with the image context buffer. The system 1600 may also include a digital output port 1620 to provide a signal to an external device (e.g., to an HDTV device).

The following illustrates various additional embodiments. These do not constitute a definition of all possible embodiments, and those skilled in the art will understand that many other embodiments are possible. Further, although the following embodiments are briefly described for clarity, those skilled in the art will understand how to make any changes, if necessary, to the above description to accommodate these and other embodiments and applications.

Figure 17:
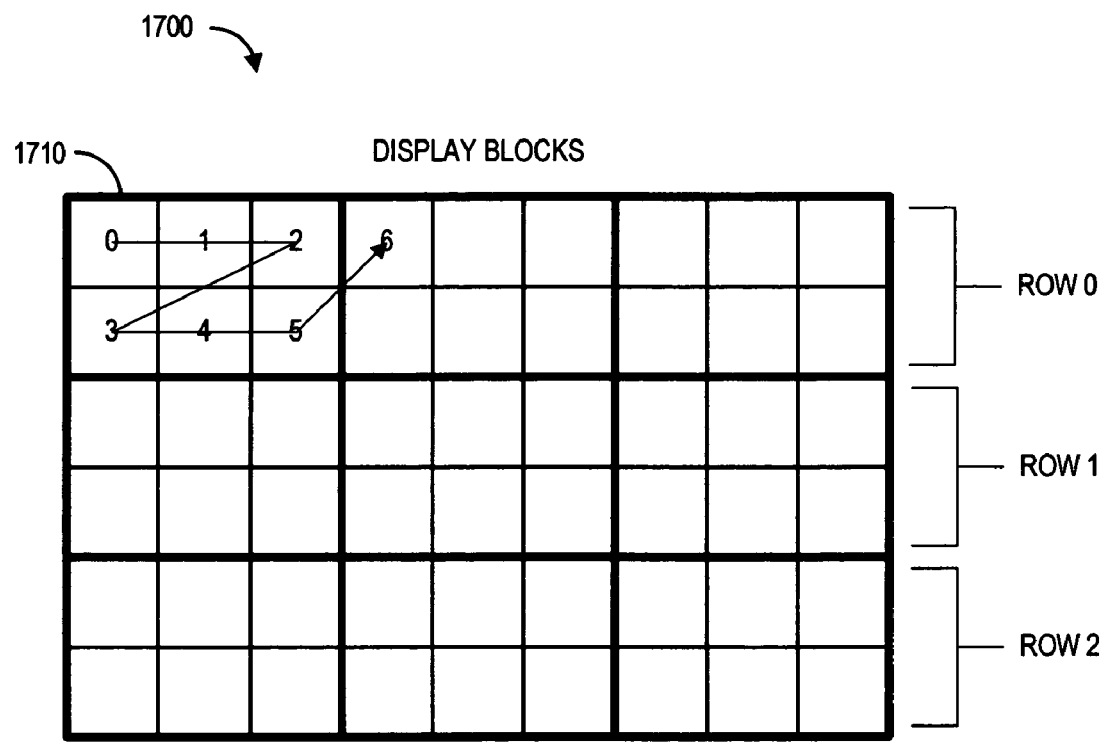
FIG. 17 illustrates a display divided into macroblocks and blocks according to another embodiment.

For example, although a particular context buffer addressing scheme has been described herein, embodiments may be associated with any other types of buffer numbering and mapping techniques. For example, FIG. 17 illustrates a display 1700 divided into macroblocks 1710 and blocks according to another embodiment. In this case, each macroblock 1710 is three blocks wide and two blocks high. Moreover, wrapping values and/or increment values described herein might be modified when determining addresses for a context buffer. For example, the modulus of CDX might be six instead of four.

Moreover, although particular image processing protocols and networks have been used herein as examples (e.g., H.264 and MPEG4), embodiments may be used in connection any other type of image processing protocols or networks, such as Digital Terrestrial Television Broadcasting (DTTB) and Community Access Television (CATV) systems. Note that any of the embodiments described herein might be associated with, for example, an Application Specific integrated Circuit (ASIC) device, a processor, an image encoder, or an image decoder.

The several embodiments described herein are solely for the purpose of illustration. Persons skilled in the art will recognize from this description other embodiments may be practiced with modifications and alterations limited only by the claims.

What is claimed is:

1. A method, comprising:
   initializing, by a decoder processor, at least one modular index to "2";
   accessing context information for a current image block being processed, the current image block being associated with a four-block macroblock, the context information being associated with a block neighboring the current block, wherein said accessing is performed in accordance with an address;
   adjusting at least one of a plurality of modular indexes, wherein said adjusting includes incrementing at least one modular index to produce a sequence of "2," "3," "0," and "1"; and
   determining a next address in accordance with the plurality of modular indexes.

2. The method of claim 1, wherein the plurality of modular indexes are associated with at least one of: (i) a macroblock index value, (ii) a block index value, or (iii) a context index value.

3. The method of claim 2, wherein said determining is associated with a modular addition of the macroblock index value, the block index value, and the context index value.

4. The method of claim 3, wherein the next address is further based on a context data size.

5. The method of claim 1, wherein different modular indexes are associated with at least one of: (i) a different modulus, or (ii) a different increment value.

6. The method of claim 1, wherein the "2," "3," and "0" values are associated with reading context information from a buffer, and the "1" value is associated with writing into the buffer information about the current block.

7. The method of claim 1, wherein said adjusting comprises incrementing a value stored in the index by an amount greater than one.

8. The method of claim 1, wherein said accessing comprises retrieving image parameters from a buffer.

9. The method of claim 8, further comprising:
   storing image parameters associated with the current block into a buffer location associated with the next address.

10. The method of claim 8, wherein the modulus of a macroblock index is associated with a number of locations in the buffer.

11. The method of claim 8, further comprising:
    initializing at least one buffer location with default boundary information.

12. An apparatus, comprising:
    a buffer to store information associated with image blocks and four-block macroblocks;
    a first modular counter to store a first index value, the first modular counter being initialized to "2";
    a second modular counter to store a second index value; and an address determination unit to adjust at least one of the first or second counters and to determine a location in the buffer based on the first and second index values, wherein said adjusting includes incrementing the first modular counter to produce a sequence of "2," "3," "0," and "1".

13. The apparatus of claim 12, wherein the address determination unit comprises a modular adder.

14. The apparatus of claim 13, further comprising a shifter to multiply a result generated by the modular adder.

15. An apparatus comprising:
a non-transitory storage medium having stored thereon instructions that when executed by a machine result in the following:
initializing a first modular index to "2,"
accessing context information for a current image block being processed, the current image block being associated with a four-block macroblock, the context information being associated with a block neighboring the current block, wherein said accessing is performed in accordance with an address,
adjusting the first modular index after reading context information associated with a block neighboring the current image block being processed, wherein said adjusting includes incrementing the first modular index to produce a sequence of "2," "3," "0," and "1,"
adjusting a second modular index after said reading, and
calculating an address associated with a subsequent block to be accessed based at least in part on the first and second indexes.

16. The apparatus of claim 15, wherein execution of the instructions further results in:
decoding macroblocks in accordance with at least one of: (i) H.264 information, (ii) Motion Picture Experts Group 2 information, or (iii) Motion Picture Experts Group 4 information.

17. The apparatus of claim 15, wherein the apparatus is associated with at least one of: (i) an application specific integrated circuit, (ii) a processor, (iii) an image encoder, or (iv) an image decoder.

18. A system, comprising:
a cache to store image information associated with blocks and four-block macroblocks, each block representing a portion of an image frame;
a first storage unit to store a first value associated with a first modular index, the first modular index being initialized to "2";
a second storage unit to store a second value associated with a second modular index;
an address determination unit to adjust at least one of the first or second values and to determine a location in the buffer based on the first and second values, wherein said adjusting includes incrementing the first modular index to produce a sequence of "2," "3," "0," and "1"; and
a digital output to provide a digital signal to a digital display device.

19. The system of claim 18, wherein the first value is associated with a macroblock, the second value is associated with a block, and further comprising:
a third storage unit to store a third value associated with a modular context index.

20. The system of claim 18, wherein the system is associated with at least one of: (i) a mobile computer, (ii) a television, (iii) a digital video recorder, (iv) a game device, (v) a personal computer, or (vi) a set-top box.

* * * * *